Figure 1:
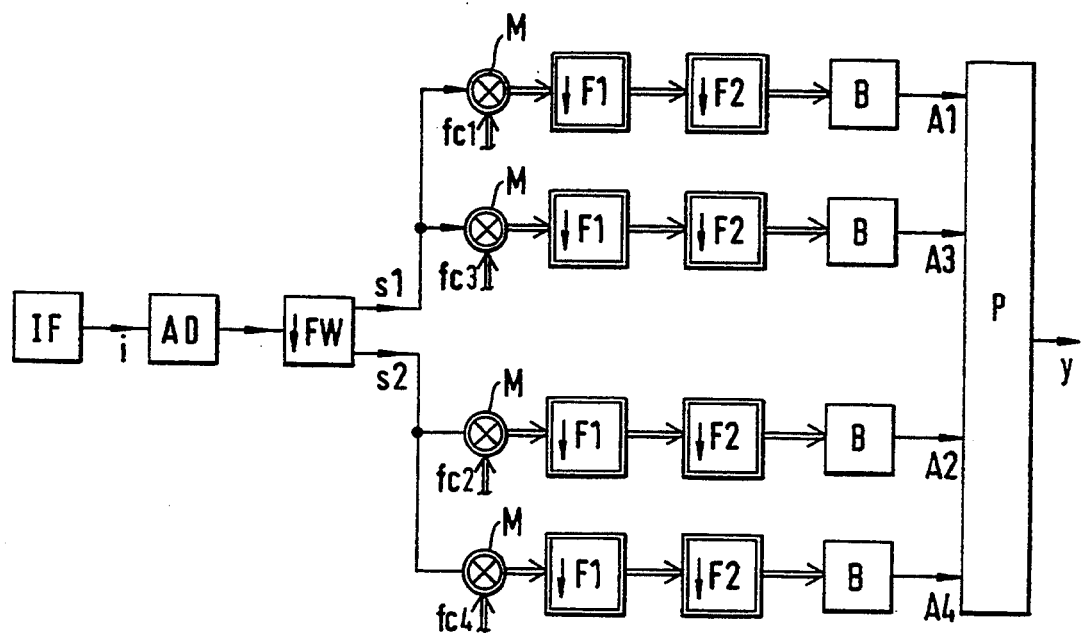

United States Patent [19]

Göckler

[11] Patent Number: 5,369,487
[45] Date of Patent: Nov. 29, 1994

[54] DEVICE FOR DETERMINING THE AMPLITUDE OF THE SPECTRAL LINES IN THE OUTPUT SIGNAL FROM A RING INTERFEROMETER

[75] Inventor: Heinz Göckler, Backnang, Germany

[73] Assignee: Ant Nachrichtentechnik GmbH, Backnang, Germany

[21] Appl. No.: 945,968

[22] PCT Filed: Mar. 14, 1991

[86] PCT No.: PCT/DE91/00225
§ 371 Date: Nov. 6, 1992
§ 102(e) Date: Nov. 6, 1992

[87] PCT Pub. No.: WO91/17411
PCT Pub. Date: Nov. 14, 1991

[30] Foreign Application Priority Data

May 7, 1990 [DE] Germany .................. 4014516

[51] Int. Cl.⁵ ............................. G01C 19/72
[52] U.S. Cl. ................................. 356/350
[58] Field of Search ................. 356/350, 345; 250/227.19, 227.27; 385/14

[56] References Cited

U.S. PATENT DOCUMENTS

| | | | |
|---|---|---|---|
| 4,796,993 | 1/1989 | Sonobe et al. | 356/350 |
| 4,883,358 | 11/1989 | Okada | 356/350 |
| 5,048,962 | 9/1991 | Kurokawa et al. | 356/350 |
| 5,127,732 | 7/1992 | Gockler | 356/350 |

OTHER PUBLICATIONS

"Fiber Optic Gyro with Digital Data Processing", Böhm et al, Conference Proceedings OFS '84, Sep. 1984, pp. 251–258.

*Primary Examiner*—Samuel A. Turner
*Attorney, Agent, or Firm*—Spensley Horn Jubas & Lubitz

[57] ABSTRACT

An arrangement for determining the amplitudes of spectral lines contained in the phase-modulated output signal of an optical ring interferometer which are suited to determine the angular velocity with which the ring interferometer is rotated, for which a digital evaluation circuit is utilized. Two light waves moving in opposite directions in a fiber optical wave guide are analyzed upon exiting the wave guide. The light waves exiting at one end of the fiber optic wave guide are phase-modulated in order to obtain an output signal of the fiber ring interferometer suitable for determining the Sagnac phase.

18 Claims, 4 Drawing Sheets

DEVICE FOR DETERMINING THE AMPLITUDE OF THE SPECTRAL LINES IN THE OUTPUT SIGNAL FROM A RING INTERFEROMETER

The present invention relates to an arrangement for determining the amplitudes of spectral lines contained in the phase-modulated output signal of an optical ring interferometer which are suited to determine the angular velocity with which the ring interferometer is rotated, for which a digital evaluation circuit is utilized.

Such a method is disclosed in DE 31 40 110 A1. Two light waves moving in opposite directions are propagated in the fiber-optical wave guide, forming a ring-shaped light path, of the ring interferometer and interfere with each other when they exit. The interference is a function of the angular velocity with which the fiber-optical wave guide, which forms at least one coil, is rotated. The phase difference between the two light waves which have travelled through the fiber-optical wave guide in opposite directions is proportional to the angular velocity. As can be gathered from DE 31 40 110 A1, this phase difference, which is called a Sagnac phase, can be determined from the amplitudes of the spectral lines of the interference light exiting the fiber-optical wave guide.

The light waves exiting at one end from the fiber-optical wave guide are phase-modulated in order to obtain an output signal of the fiber ring interferometer suitable for determining the Sagnac phase. Evaluation of the analog output signal is advantageously performed by means of digital signal processing to determine the Sagnac phase. Since the analog output signal has a disadvantageously high frequency level for subsequent digital signal processing because of the required high phase modulation frequency, according to DE 31 40 110 A2 either the output of the light fed into the fiber ring interferometer is pulsed with a suitable frequency or the output signal is reduced by means of a mixer to a lower frequency level. Both solutions involve additional circuit expenditures. A further disadvantage of the mixing process is that undesired mixing products are created which must be suppressed by additional analog filtering so that the scanning theorem is satisfied and therefore no impermissible spectral convolution products are created which would greatly distort the signal to be evaluated.

It is therefore the object of the invention to recite an arrangement of the previously mentioned type which determines, with a small technical expenditure in circuits, as exactly as possible the amplitudes of desired spectral lines from the output signal of a ring interferometer.

The above and other objects are achieved, according to the present invention, in a digital evaluation circuit for determining the amplitudes of spectral lines contained in a digitized phase-modulated output signal of an optical ring interferometer which is being rotated, wherein the spectral lines contain information indicating the angular velocity with which the ring interferometer is being utilized, by the improvement wherein the circuit comprises: a frequency-selective filter connected for splitting the digitized output signal of the ring interferometer into first and second signal portions, the first signal portion containing spectral lines corresponding to odd-numbered multiples of a given frequency which is one of the phase modulation frequency and a frequency derived from the phase modulation frequency and the second signal portion containing spectral lines corresponding to even-numbered multiples of the given frequency, wherein the spectral lines contained in the first and second signal portions are available by selective frequency separation; and two digital filters each connected to receive a respective signal portion and to filter out of the respective signal portion a signal element at the frequency of one selected spectral line in order to allow determination of the amplitude of the filtered spectral line.

Advantageous embodiments and features of the invention will be described below.

Because of the employment of a frequency-selective filter in accordance with the invention, no great demands need to be made on the subsequent digital filters in respect to their selection.

Figure 2:
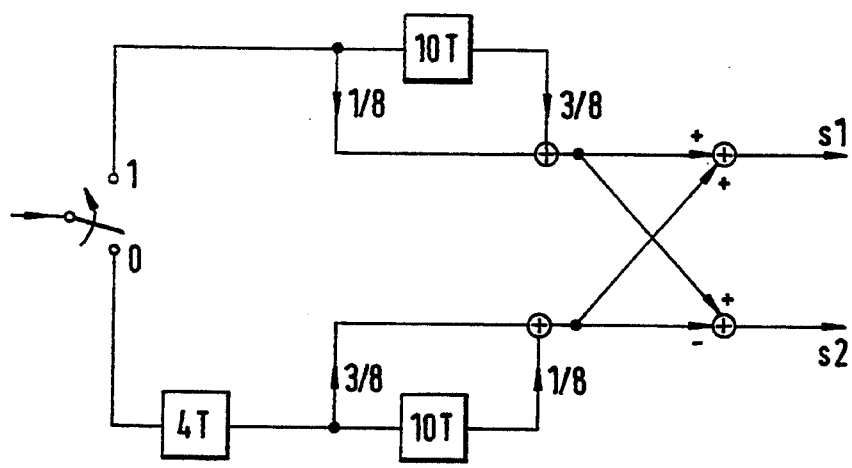
Figure 3:
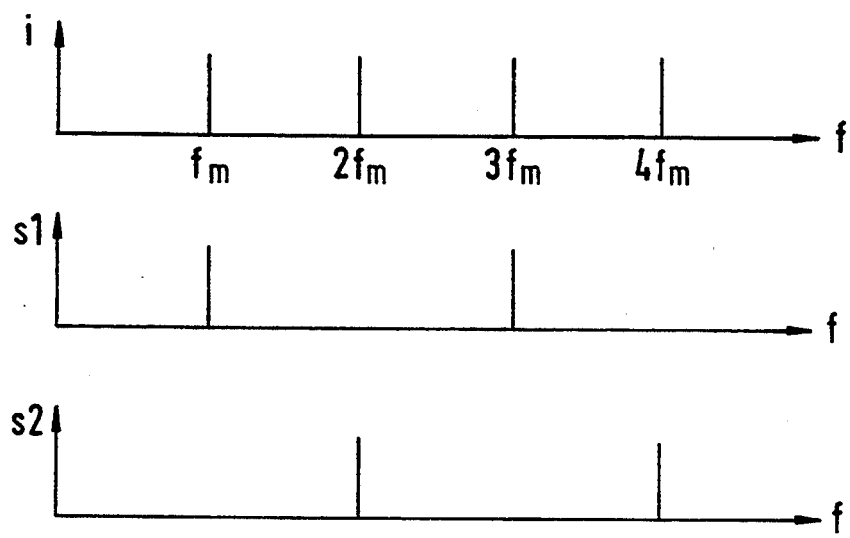
Figure 4:
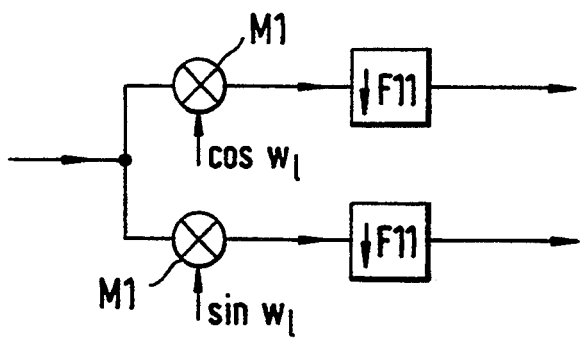
Figure 5:
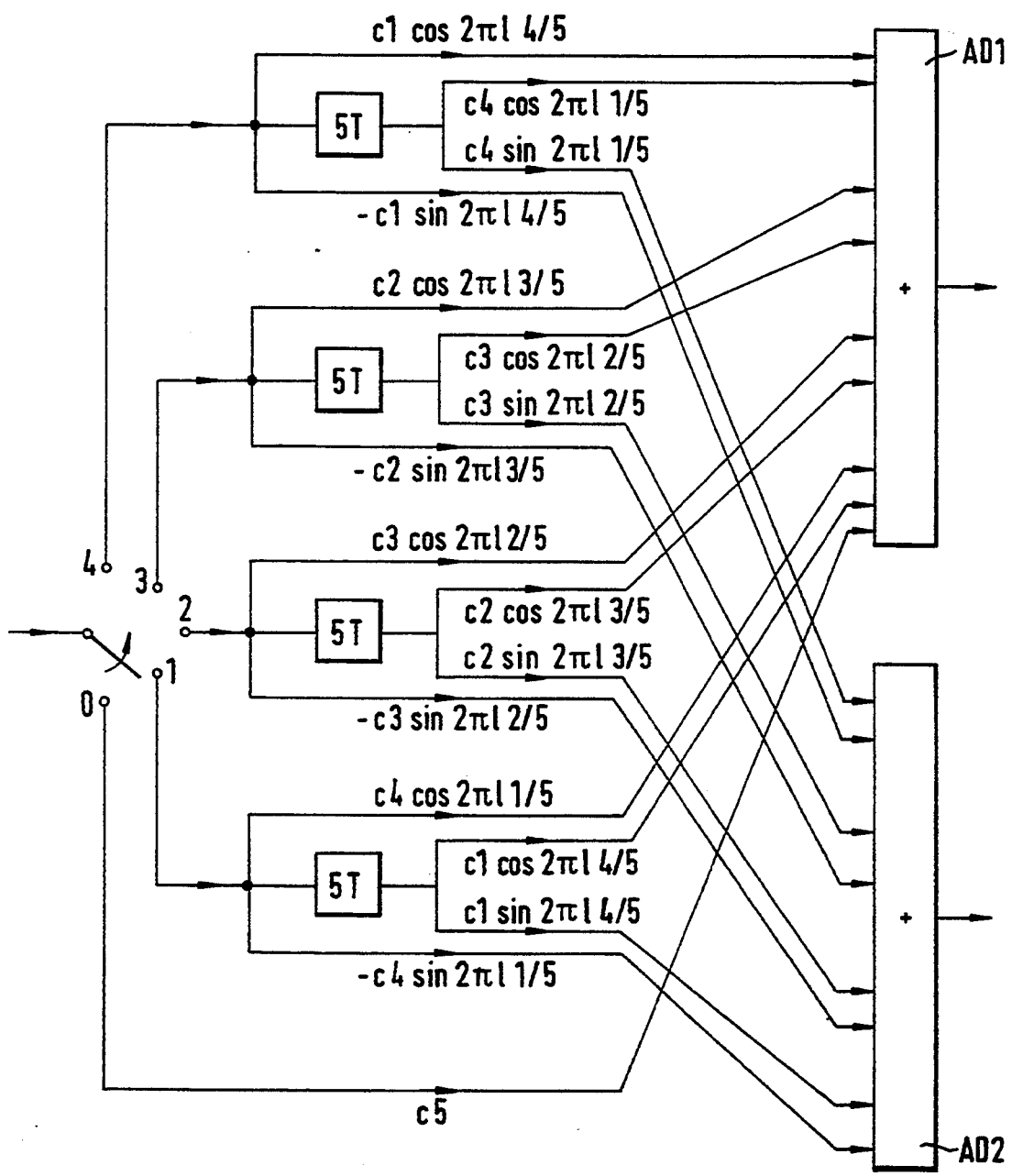
Figure 6:
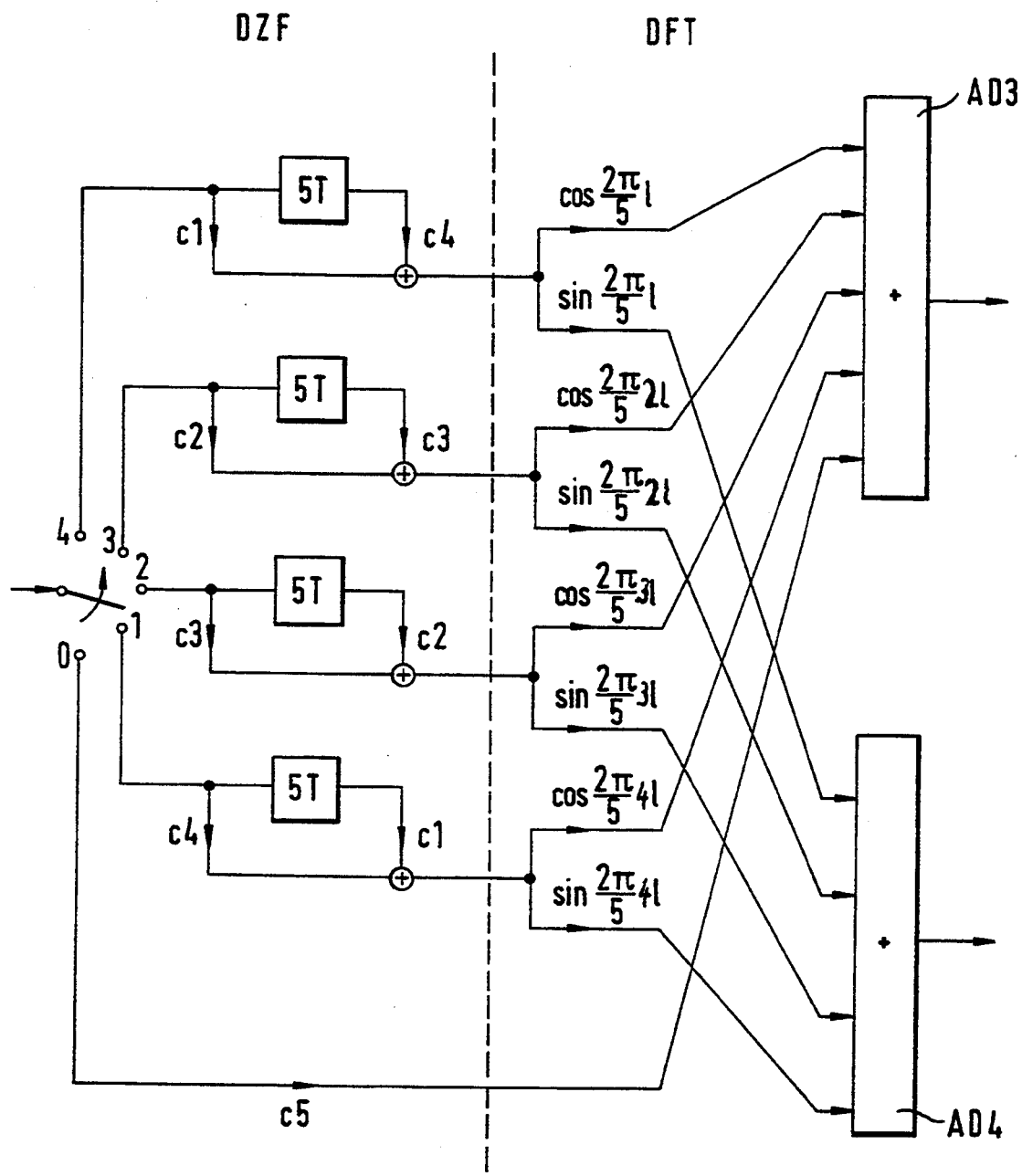

The invention will be described in detail below by means of several exemplary embodiments illustrated in the drawings. Shown are in:

FIG. 1 a block diagram of a circuit for determining the amplitudes of certain spectral lines from the output signal of a ring interferometer, FIG. 2 a frequency-selective filter of this circuit, FIG. 3 several frequency spectra, FIG. 4 a first embodiment, FIG. 5 a second embodiment, and FIG. 6 a third embodiment of a complex digital filter.

The output signal of a ring interferometer is known (see DE 31 40 110 A1) to have the following form:

$$\begin{aligned}i(t) = \ & I_o[1 + J_o(2\psi)\cos 2\phi] - \\ & 2I_oJ_1(2\psi)\sin 2\phi \cos(2\pi f_m t - \alpha) - \\ & 2I_oJ_2(2\psi)\cos 2\phi \cos 2(2\pi f_m t - \alpha) + \\ & 2I_oJ_3(2\psi)\sin 2\phi \cos 3(2\pi f_m t - \alpha) + \\ & 2I_oJ_4(2\psi)\cos 2\phi \cos 4(2\pi f_m t - \alpha) \\ & \cdot \\ & \cdot \end{aligned}$$

Here, the factors $J_n(2\psi)$ with $n = 0, 1, 2, \ldots$ are the values of the 1st order Bessel function for the argument $2\psi = 2\psi_o \sin \pi f_m \tau$. $I_o$ indicates the intensity of the light fed to the ring interferometer, $\psi_o$ the modulation index of the phase modulation performed with the frequency $f_m$ and $\tau$ the travel time of the light waves through the ring interferometer. The so-called Sagnac phase is indicated by $\phi$, which is proportional to the angular velocity with which the ring interferometer is being turned. This Sagnac phase $\phi$ is to be determined in the end. It can be calculated from the amplitudes of three or four spectral lines of the output signal i(t). The amplitudes A1 to A4 of, for example four spectral lines, which are functions of the Sagnac phase are listed below:

$A1 = 2I_oJ_1(2\psi) \, |\sin 2\phi|$ $A2 = 2I_oJ_2(2\psi) \cos 2\phi$ $A3 = 2I_oJ_3(2\psi) \, |\sin 2\phi|$ $A4 = 2I_oJ_4(2\psi) \cos 2\phi$ A circuit is shown in FIG. 1, by means of which the four spectral line amplitudes A1 to A4 can be determined. The analog output signal i(t) of a ring interferometer IP first is digitized in an analog-digital converter AD and is then supplied to a frequency-selective filter FW, which splits the digitized output signal into two signal portions s1 and s2. The first signal portion s1 contains all spectral lines of the output signal i(t) [see equation (1)] with the odd-numbered multiples of the phase modulation frequency $f_m$ (or of a frequency derived therefrom), i.e. all spectral lines the amplitudes of which are functions of sin $2\phi$. The second signal portion s2 contains all spectral lines with the even-numbered multiples of the phase modulation frequency $f_m$ (or of a frequency derived therefrom), i.e. all spectral lines the amplitudes of which are functions of cos$2\phi$. FIG. 3 illustrates the splitting of the output signal i(t) with the spectral lines $nf_m$ (n=1, 2, 3, ... ) into the first signal portion s1, which only contains the spectral lines with the odd-numbered multiples of the phase modulation frequency $f_m$, and into the second signal portion, which only contains the even-numbered multiples of the phase modulation frequency $f_m$. A pre-selection of the spectral lines takes place by means of this split of the output signal i(t) into the two signal portions s1 and s2, which has the advantageous consequence that the distances between the spectral lines appearing in each signal portion are twice as large as the distances between the spectral lines of the original output signal. For this reason the selection of the individual signal portions s1 and s2 can be performed with less expensive, i.e. less selective filters.

Each signal portion s1, s2 is supplied to two parallel filter branches, which determine the spectral line amplitudes A1 and A3, which are functions of sin$2\phi$, from the first signal portion s1, and from the second signal portion s2 the spectral line amplitudes A2 and A4, which are functions of cos$2\phi$. A mixing arrangement M is contained in each filter branch, which nominally reduces a respective spectral line from the signal portion s1 or s2 supplied to it to the frequency zero and in the course of this changes the originally real signal into a complex signal. For this purpose, each mixing arrangement M is charged with a complex scanned carrier signal of the form $$e^{-j2\pi f_{cl} k/f_A'} \quad (3)$$

where $f_{cl}=lf_m$ (with l=1, 2, 3, 4), $f_A$ is the scanning frequency of the respective signal portion s1 or s2, and k=1, 2, 3 ... (time index). Following the mixing arrangement M is a complex low bandpass filter F1, with which possibly a further complex low bandpass filter F2 is connected in series. After the frequency-selective filter FW already has lowered the scanning frequency of the digitized output signal, the scanning frequency is further reduced in each filter F1, F2, so that it has an advantageous lower value for the digital processing of the spectral line amplitudes A1 to A4. Because of the fact that each spectral line which is to be selected in a filter branch is nominally converted to frequency zero, it is possible to use identical complex digital low bandpass filters F1 or F2 in all filter branches.

The respectively filtered-out spectral line, split into a real and an imaginary portion, is available at the output of each complex digital low bandpass filter F1, F2. Its amplitude A1, A2, A3, A4 can be determined in a known manner by squaring the real and the imaginary portions, their addition and subsequent root formation. This operation is performed by a circuit block B. The circuit blocks M, F1, F2 which process complex signals are shown by double lines in FIG. 1.

The Sagnac phase $\phi$ is calculated from the detected spectral line amplitudes A1 to A4 in a processor P. How to derive the Sagnac phase $\phi$ from four spectral line amplitudes is disclosed in the older German patent application P 39 35 357. The older German patent application P 39 41 991 proposes a method in accordance with which the Sagnac phase $\phi$ can be determined from three spectral line amplitudes. In accordance with the latter, only three filter branches are required.

In accordance with FIG. 2, the frequency-selective filter FW is embodied as a comb filter in which the transmission bands and the stop bands iteratively alternate periodically equidistant in the frequency range from 0 to $f_A$ (scanning frequency of the analog-digital converter AD).

It is assumed that $f_A = p \cdot f_m$, where p/2 is a whole, odd number. In case p=10, i.e. where the scanning frequency $f_A$ of the digitized output signal of the ring interferometer corresponds to ten times the phase modulation frequency $f_m$, the delay rates (10 T, 4 T with T=1/$f_A$) and coefficients ($\frac{1}{2}$, $\frac{3}{8}$) should be selected in the comb filter as indicated in FIG. 2. Because of the reversal at the input between the circuit paths 0 and 1 with the scanning frequency $f_A$, the scanning frequency $f_A$, of the two signal portions s1 and s2 is reduced to $f_{A'} = \frac{1}{2} f_A$ at the output of the comb filter. In this frequency-selective filter embodied as a comb filter, the two signal portions s1 and s2 are always given the same value, i.e. even errors have the identical effect on both signal portions. Because of this there are no distortions generated when determining the Sagnac phase $\phi$, because the Sagnac phase is calculated from the signal portions s1 and s2 by forming the quotient of the amplitudes (see P 39 35 357).

The complex mixing arrangement M and the complex low bandpass filter F1 connected downstream of it which in accordance with FIG. 1 are present in each filter branch can, as shown in FIG. 4, be realized by means of two real mixers M1 and two downstream connected identical, digital (for example transverse) low bandpass filters F11 with real components. The low bandpass filters F1 best reduce the scanning frequency $f_A$, of the output frequency of the frequency-selective filter FW by the factor p/2, i.e. by the factor 5. The respective signal portion s1 or s2 with the carrier cos $\omega_1$, provided by the frequency-selective filter FW, is mixed down to the frequency F=0 in one of the two mixers M1. The mixing product generated in the course of this represents the real portion of the signal portion. The associated imaginary portion is generated by means of the mixing process of the signal portion s1 or s2 with the carrier sin $\omega_1$ in the other mixer M1. The two carrier signals cos $\omega_1$ and sin $\omega_1$ have the argument $\omega_1 = 2\pi f_{cl} k/f_{A'}$. This type of complex filtering is described by M. Bellanger in his book "*Digital Processing of Signals*", 2nd. Edition, John Wiley & Sons, publ., pages 356 and 357.

The combination of a complex mixing arrangement M and a complex filter F1 present in each filter branch in accordance with FIG. 1 can also be realized by means of a transverse digital filter with complex coefficients. Such a filter can be seen in FIG. 5, which consists, for example, of five (=p/2) signal paths 0 ... 4, to which the scanning values of the signal portion s1 or s2 provided by the frequency-selective filter FW are cyclically switched. This switching process reduces the scanning frequency $f_A$, of the respective signal portion s1 or s2 by the factor p/2=5, the same as the original arrangement. The real and imaginary coefficients required for the filter have been entered in FIG. 5. A first adder AD1 at the output of the filter circuit adds all real signal components from the five signal paths, and the imaginary signal components are combined by a second adder AD2.

A further variant of a filter arrangement, which filters out a particular spectral line from the real signal portion s1 or s2 provided by the frequency-selective filter FW and converts it into a complex signal with a scanning frequency reduced by the factor p/2 (=5), can be seen in FIG. 6. This filter arrangement consists of a decimation filter DZF (on the left side of the dashed line) embodied as a polyphase network with real coefficients C1 ... C5, in which the scanning frequency is reduced by the factor p/2=5 by means of a switching process, as in the filter of FIG. 5. A network DFT follows the decimation filter DZF, which splits the spectral line separated by the decimation filter DZF into a real and an imaginary signal by means of a discrete Fourier transformation.

The coefficients required for the network DFT have been entered into FIG. 6. A first adder AD3 at the output of the network DFT combines the real signal components, and a second adder adds the imaginary signal components.

A further advantage in regard to efforts of the arrangement in accordance with FIG. 6 is that only one decimation filter DZF is required for each signal portion s1 or s2 (i.e. a total of 2DZF), and that only one discrete network DFT must be provided for the individual amplitudes.

I claim:

1. In a digital evaluation circuit for determining amplitudes of spectral lines contained in a digitized phase-modulated output signal of an optical ring interferometer which is being rotated, wherein the spectral lines contain information indicating the angular velocity with which the ring interferometer is being utilized, the improvement wherein said circuit comprises: a frequency-selective filter connected for splitting a digitized output signal of the ring interferometer into first and second signal portions, the first signal portion containing spectral lines corresponding to odd-numbered multiples of a given frequency which is one of the phase modulation frequency and a frequency derived from the phase modulation frequency and the second signal portion containing spectral lines corresponding to even-numbered multiples of the given frequency, wherein the spectral lines contained in the first and second signal portions are available by selective frequency separation; and two digital filters each connected to receive a respective signal portion and to filter out of the respective signal portion a signal element at the frequency of one selected spectral line in order to allow determination of the amplitude of the filtered spectral line.

2. An arrangement in accordance with claim 1, wherein said digital filters are complex filters, and each said complex filter splits a signal element into a real signal component and an imaginary signal component, with which said circuit can determine the amplitude of the filtered out spectral lines from the real and imaginary components by quantification.

3. An arrangement in accordance with claim 2, wherein said digital filters are low bandpass filters which filter the signal elements out of frequency ranges containing the selected spectral lines after the selected spectral lines have been mixed down to a very low frequency level.

4. An arrangement in accordance with claim 1, wherein said digital filters are low bandpass filters which filter the signal elements out of frequency ranges containing the selected spectral lines after the selected spectral lines have been mixed down to a very low frequency level.

5. An arrangement in accordance with claim 1, wherein the frequency-selective filter is a comb filter.

6. An arrangement in accordance with claim 4, wherein the ring interferometer produces an analog phase-modulated output signal and the digitized phase-modulated output signal is formed by sampling the analog signal at a sampling frequency, and said frequency-selective filter halves the sampling frequency of the digitized output signal of the ring interferometer.

7. An arrangement in accordance with claim 1, wherein the ring interferometer produces an analog phase-modulated output signal and the digitized phase-modulated output signal is formed by sampling the analog signal at a sampling frequency, and said frequency-selective filter halves the sampling frequency of the digitized output signal of the ring interferometer.

8. An arrangement in accordance with claim 7, wherein said digital filters further reduce the sampling frequency of the signal portions emitted by said frequency-selective filter.

9. An arrangement in accordance with claim 1, wherein the ring interferometer produces an analog phase-modulated output signal and the digitized phase-modulated output signal is formed by sampling the analog signal at a sampling frequency, and each digital filter comprises a plurality of complex filters connected together in cascade and each being operative to reduce the sampling frequency of the signal supplied to it.

10. An arrangement in accordance with claim 9, wherein said digital filters are complex filters, and each said complex filter splits a signal element into a real signal component and an imaginary signal component, with which said circuit can determine the amplitude of the filtered out spectral lines from the real and imaginary components by quantification.

11. An arrangement in accordance with claim 9, wherein said digital filters are low bandpass filters which filter the signal elements out of frequency ranges containing the selected spectral lines after the selected spectral lines have been mixed down to a very low frequency level.

12. An arrangement in accordance with claim 1, wherein the ring interferometer produces an analog phase-modulated output signal and the digitized phase-modulated output signal is formed by sampling the analog signal at a sampling frequency, and each of said digital filters is a transverse filter with complex coefficients which generates complex output signals with a reduced sampling frequency from a real signal provided by said frequency-selective filter.

13. An arrangement in accordance with claim 12, wherein said digital filters are complex filters, and each said complex filter splits a signal element into a real signal component and an imaginary signal component, with which said circuit can determine the amplitude of the filtered out spectral lines from the real and imaginary components by quantification.

14. An arrangement in accordance with claim 12, wherein said digital filters are low bandpass filters which filter the signal elements out of frequency ranges containing the selected spectral lines have been mixed down to a very low frequency level.

15. An arrangement as defined in claim 1, wherein the ring interferometer produces an analog phase-modulated output signal and the digitized phase-modulated output signal is formed by sampling the analog signal at a sampling frequency, and each said digital filter comprises: a polyphase filter operative to reduce the sampling frequency of the respective signal portion and to produce a real filtered signal; and a network connected to perform discrete Fourier transformation on the signal produced by said polyphase filter and to split the real signal into a real signal component and an imaginary signal component.

16. An arrangement in accordance with claim 1, wherein the ring interferometer produces an analog phase-modulated output signal and the digitized phase-modulated output signal is formed by sampling the analog signal at a sampling frequency, and the sampling frequency of the digitized output signal of the ring interferometer is equal to p times the given frequency, where p/2 is an odd integer.

17. An arrangement in accordance with claim 16, wherein said digital filters are complex filters, and each said complex filter splits a signal element into a real signal component and an imaginary signal component, with which said circuit can determine the amplitude of the filtered out spectral lines from the real and imaginary components by quantification.

18. An arrangement in accordance with claim 16, wherein said digital filters are low bandpass filters which filter the signal elements out of frequency ranges containing the selected spectral lines after the selected spectral lines have been mixed down to a very low frequency level.

* * * * *